(12) United States Patent
Yun

(10) Patent No.: US 7,170,668 B2
(45) Date of Patent: Jan. 30, 2007

(54) HYBRID LIGHT MODULATOR

(75) Inventor: Sang Kyeong Yun, Kyunggi-do (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 10/951,556

(22) Filed: Sep. 28, 2004

(65) Prior Publication Data
US 2005/0243402 A1 Nov. 3, 2005

(30) Foreign Application Priority Data
Apr. 29, 2004 (KR) .............. 10-2004-0029925

(51) Int. Cl.
G02B 26/00 (2006.01)
(52) U.S. Cl. .................................... 359/291
(58) Field of Classification Search ............ 359/231, 359/298, 299, 302, 558, 566, 569, 572, 573, 359/291, 295, 213, 224, 226, 230, 290, 292, 359/846, 855
See application file for complete search history.

(56) References Cited

U.S. PATENT DOCUMENTS

| 5,311,360 | A | 5/1994 | Bloom et al. |
| 6,842,166 | B2* | 1/2005 | Hasegawa et al. ........ 345/107 |
| 2005/0077803 | A1* | 4/2005 | Ha et al. ................. 310/324 |

FOREIGN PATENT DOCUMENTS

| KR | 2001-53201 | 6/2001 |
| KR | 2003-77389 | 11/2003 |

* cited by examiner

Primary Examiner—Hung Xuan Dang
Assistant Examiner—Tuyen Tra
(74) Attorney, Agent, or Firm—Christensen O'Connor Johnson Kindness PLLC

(57) ABSTRACT

The present invention provides a hybrid light modulator which includes a plurality of ribbons each having a plurality of protrusions to diffract incident light even at an early light receiving stage and to control a diffractive angle of the light beam using a microactuator, thereby realizing miniaturization of a device and assuring ease of digital operation.

15 Claims, 13 Drawing Sheets

HYBRID LIGHT MODULATOR

BACKGROUND OF THE INVENTION

1. Field of the Invention

The present invention relates generally to light modulators, and more particularly, to a hybrid light modulator which includes a plurality of ribbons each having a plurality of protrusions to diffract incident light from an early light receiving stage and to control a diffractive angle of the light beam using a microactuator, thereby realizing the miniaturization of a device and assuring the ease of digital operation, unlike conventional diffractive optical modulators in which incident light is reflected and diffracted by the operation of a plurality of micromirror actuators.

2. Description of the Related Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase only filter, an optical logic gate, a light amplifier, an image processing technique, an optical device, and a light modulator using a spatial light modulation theory. The spatial light modulator is applied to optical memory, optical display device, printer, optical interconnection, and hologram fields, and studies have been conducted to develop a display device employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited. The nitride film 14 is patterned by the ribbons 18, and a portion of the silicon dioxide film 12 is etched, thereby maintaining the ribbons 18 on an oxide spacer layer 12 by a nitride frame 20. In order to modulate light having a single wavelength of $\lambda_o$, the modulator is designed so that thicknesses of the ribbon 18 and oxide spacer 12 are each $\lambda_o/4$.

Limited by a vertical distance (d) between a reflective surface 22 of each ribbon 18 and a reflective surface of the substrate 16, a grating amplitude of the modulator 10 is controlled by applying a voltage between the ribbon 18 (the reflective surface 22 of the ribbon 18 acting as a first electrode) and the substrate 16 (a conductive layer 24 of a lower side of the substrate 16 acting as a second electrode). In its undeformed state, with no voltage application, the grating amplitude is $\lambda_o/2$, and a total round-trip path difference between light beams reflected from the ribbon and substrate is one wavelength $\lambda_o$, and thus, a phase of reflected light is reinforced. Accordingly, in its undeformed state, the modulator 10 acts as a plane mirror when it reflects light. In FIG. 2, reference numeral 20 denotes incident light and reflected light in its undeformed state.

When a proper voltage is applied between the ribbon 18 and substrate 16, the electrostatic force enables the ribbon 18 to be moved downward toward a surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference. The modulator diffracts incident light 26 using the interference. In FIG. 3, reference numerals 28 and 30 denote light beams diffracted in a +/− diffractive mode (D+1, D−1) in a deformed state.

It has been proved that sticking between the ribbon 18 and substrate 16 is a gross problem of such a device during a wet process applied to form a space under the ribbon 18 and during operation of the modulator 10.

In an effort to overcome the above-mentioned problems, a conventional improved technology is proposed in Korean Patent Application No. 10-2000-7014798, entitled "method and a device for modulating an incident light beam to form a 2-D image", by Silicon Light Machines Inc.

In the "method and device for modulating the incident light beam to form the 2-D image", the diffractive grating light valve includes a plurality of elongate elements each having a reflective surface. The elongate elements are arranged on an upper side of a substrate so that they are parallel to each other, have support ends, and their reflective surfaces lie in array (GLV array). The elongate elements form groups according to display elements. The groups alternately apply a voltage to the substrate, resulting in deformation of the elements. The almost planar center portion of each deformed elongate element is parallel to and spaced from the center portion of the undeformed element by a predetermined distance which is set to ⅓–¼ of the distance between the undeformed reflective surface and the substrate. Thus, the deformed elongate elements are prevented from coming into contact with the surface of the substrate. Sticking between the elongate elements and the substrate is prevented by preventing contact between the elements and substrate. Additionally, the predetermined distance between each deformed elongate element and the substrate is limited so as to prevent hysteresis causing deformation of the elongate elements.

FIG. 4 is a side sectional view of an elongate element 100 of a GLV in an undeformed state according to a conventional improved technology. In FIG. 4, the elongate element 100 is suspended above a surface of a substrate (including constitution layers) by ends thereof. In FIG. 4, reference numeral 102 denotes an air space.

FIG. 5 is a plan view of a portion of the GLV including six elongate elements 100. The elongate elements 100 have the same width and are arranged parallel to each other. The elongate elements 100 are spaced close to each other, so that the elongate elements 100 can be deformed independently from other elements.

FIG. 6 is a front view of a display element 200 having undeformed elongate elements 100. FIG. 6 is a view taken in the direction of the arrows along the line A–A' of FIG. 5. The undeformed state is selected by equalizing a bias on the elongate elements 100 to a conductive layer 106. Since reflective surfaces of the elongate elements 100 are substantially co-planar, light incident on the elongate elements 100 is reflected.

FIG. 7 is a front view of the display element 200 in which the deformed elongate elements 100 are alternately arranged. FIG. 7 is a view corresponding to FIG. 6, but showing the deformed elongate elements 100. The elongate ribbons 100 which are not removed are maintained at desired positions by an applied bias voltage. Deformation of the moving elongate ribbons 100 is achieved by alternate applications of operation voltages through the conductive layer 106 to the elongate elements 100. A vertical distance ($d_1$) is almost constant to the almost planar center part 102, thereby limiting the grating amplitude of the GLV. The grating amplitude ($d_1$) may be controlled by adjusting an operation voltage on the operated elongate elements 100. This results in precision tuning of the GLV in an optimum contrast ratio.

However, the light modulator which is manufactured by Silicon Light Machines Inc. and adopts an electrostatic method to control the position of a micromirror is disadvantageous in that an operation voltage is relatively high (usually 30 V or so) and a correlation between the applied voltage and displacement is nonlinear, and thus, reliability is poor in the course of controlling light.

Conventional light modulators disclosed in the patent filed by Bloom et al. have been used to form structures which display images. At this time, in each light modulator, two neighboring elements form one pixel. Of course, three neighboring elements may form one pixel. Alternatively, four neighboring elements may form one pixel. As a further alternative, six neighboring elements may form one pixel. In the case that a display device has an optical system which detects only diffracted light, when no voltage is applied to elements, such as ribbons, the ribbons are maintained in those original positions. At this time, pixels are dark, that is, are in a state of being turned off. Otherwise, when voltage is applied to the ribbons, the ribbons are warped downwards toward the silicon substrate. At this time, the pixels are bright, that is, attain a state of being turned on. A contrast ratio between a dark pixel and a bright pixel is a significant factor in forming the display system. In addition, an important matter in forming the display system is to accommodate the recent trend of miniaturization and high integration of electronic products.

However, the conventional light modulators disclosed in the patent filed by Bloom et al. have reached the limit in miniaturization. In other words, the conventional light modulators cannot be reduced under 3 µm in the width of the element. Furthermore, an interval between neighboring elements cannot be reduced under 0.5 µm.

SUMMARY OF THE INVENTION

Accordingly, the present invention has been made keeping in mind the above problems occurring in the prior art, and an object of the present invention is to provide a hybrid light modulator which includes ribbons having uneven upper surfaces, so that incident light is diffracted by the uneven upper surfaces of the ribbons from an early light receiving stage, but not by controlling the height difference between moving ribbons, thus realizing miniaturization and high integration of the hybrid light modulator.

In an aspect, the present invention provides a hybrid light modulator, including a substrate; and a light modulating element having a ribbon shape, attached at both ends thereof to the substrate while being spaced at an intermediate portion thereof from a bottom of the recess, and having a thin-film piezoelectric material layer, so that the intermediate portion of the light modulating element moves vertically when voltage is applied to both sides of the thin-film piezoelectric material layer. The light modulating element further has a plurality of protrusions on an upper surface thereof to diffract incident light using both each protrusion and a part of the upper surface of the light modulating element neighboring each protrusion.

In another aspect, the present invention provides a hybrid light modulator, including a substrate having a recess thereon to provide an air space to an intermediate portion of the substrate; and a lower supporter having a ribbon shape and attached at both ends thereof to the substrate along upper ends of sidewalls of the recess of the substrate while being spaced from a bottom of the recess at an intermediate portion thereof. The lower supporter is vertically movable at the intermediate portion thereof, which is spaced from the substrate. The hybrid light modulator further includes a light modulating element laminated on the lower supporter such that both ends of the light modulating element are placed above the recess of the substrate, and having a thin-film piezoelectric material layer, so that a predetermined portion of the light modulating element spaced from the bottom of the recess moves vertically when voltage is applied to both sides of the thin-film piezoelectric material layer. The light modulating element further has a plurality of protrusions on an upper surface thereof to diffract incident light using both each protrusion and a part of the upper surface of the light modulating element neighboring each protrusion.

In a further aspect, the present invention provides a hybrid light modulator, including a substrate having a recess thereon to provide an air space to an intermediate portion of the substrate; a lower supporter having a ribbon shape and attached at both ends thereof to the substrate along upper ends of sidewalls of the recess of the substrate while being spaced at an intermediate portion thereof from a bottom of the recess; and a first piezoelectric layer placed at a first end thereof on a first end of the lower supporter and placed at a second end thereof on a predetermined position of the lower supporter spaced to the first side from a center line of the recess. The first piezoelectric layer has a first thin-film piezoelectric material layer to generate a vertical actuating force by shrinking and expanding when a voltage is applied to the first thin-film piezoelectric material layer. The hybrid light modulator further includes a second piezoelectric layer placed at a second end thereof on a second end of the lower supporter and placed at a first end thereof on a predetermined position of the lower supporter spaced to the second side from the center line of the recess. The second piezoelectric layer has a second thin-film piezoelectric material layer to generate a vertical actuating force by shrinking and expanding when a voltage is applied to the second thin-film piezoelectric material layer. The hybrid light modulator further includes a mirror layer laminated on the intermediate portion of the lower supporter between the first and second piezoelectric layers. The mirror layer has a plurality of protrusions on an upper surface thereof to diffract incident light using both each protrusion and a part of the upper surface of the mirror layer neighboring each protrusion.

In yet another aspect, the present invention provides a hybrid light modulator, including a substrate having an insulating layer formed on an upper surface thereof; and a lower supporter having a ribbon shape and attached at both ends thereof to the substrate while being spaced at an intermediate portion thereof from the substrate by a predetermined distance. The lower supporter is vertically movable at the intermediate portion thereof, which is spaced from the substrate. The hybrid light modulator further includes a light modulating element laminated on the lower supporter, and having a thin-film piezoelectric material layer so that the light modulating element generates a vertical actuating force by shrinking and expanding when a voltage is applied to the piezoelectric material layer, thus being vertically moved at an intermediate portion of the light modulating element spaced from the substrate by a predetermined distance. The light modulating element further has a plurality of protrusions on an upper surface thereof to diffract incident light using both each protrusion and a part of the upper surface of the light modulating element neighboring each protrusion.

In still another aspect, the present invention provides a hybrid light modulator, including a substrate having an insulating layer formed on an upper surface thereof; and a lower supporter having a ribbon shape and attached at both ends thereof to the substrate while being spaced at an intermediate portion thereof from the substrate by a predetermined distance. The lower supporter is vertically movable at the intermediate portion thereof, which is spaced from the substrate. The hybrid light modulator further includes a first piezoelectric layer placed at a first end thereof on a first end of the lower supporter and placed at a second end thereof on a predetermined position of the lower supporter spaced to the first side from an intermediate line of the lower supporter. The first piezoelectric layer has a first thin-film piezoelectric material layer to generate a vertical actuating force by shrinking and expanding when a voltage is applied to the first thin-film piezoelectric material layer. The hybrid light modulator further includes a second piezoelectric layer placed at a second end thereof on a second end of the lower supporter and placed at a first end thereof on a predetermined position of the lower supporter spaced to the second side from the intermediate line of the lower supporter. The second piezoelectric layer has a second thin-film piezoelectric material layer to generate a vertical actuating force by shrinking and expanding when a voltage is applied to the second thin-film piezoelectric material layer. The hybrid light modulator further includes a mirror layer formed on the intermediate portion of the lower supporter between the first and second piezoelectric layers. The mirror layer has a plurality of protrusions on an upper surface thereof to diffract incident light using both each protrusion and a part of the upper surface of the mirror layer neighboring each protrusion.

In still another aspect, the present invention provides a hybrid light modulator, including a substrate having a recess thereon to provide an air space to an intermediate portion of the substrate; and a lower supporter having a ribbon shape and attached at both ends thereof to the substrate while being spaced at an intermediate portion thereof from a bottom of the recess of the substrate by a predetermined distance. The lower supporter is vertically movable at the intermediate portion thereof, which is spaced from the substrate. The hybrid light modulator further includes a piezoelectric mirror layer laminated on the lower supporter such that both ends of the piezoelectric mirror layer is placed above the recess, and having a thin-film piezoelectric material layer, so that a predetermined portion of the piezoelectric mirror layer spaced from the bottom of the recess moves vertically when voltage is applied to both sides of the thin-film piezoelectric material layer, thus reflecting or diffracting incident light; a first mirror layer laminated on a first end of the lower supporter while being stepped from the piezoelectric mirror layer, thus reflecting or diffracting incident light; and a second mirror layer laminated on a second end of the lower supporter while being stepped from the piezoelectric mirror layer, thus reflecting or diffracting incident light.

In still another aspect, the present invention provides a hybrid light modulator, including a substrate having a recess thereon to provide an air space to an intermediate portion of the substrate; a lower supporter having a ribbon shape and attached at both ends thereof to the substrate while being spaced at an intermediate portion thereof from a bottom of the recess of the substrate by a predetermined distance; and a first piezoelectric layer placed at a first end thereof on a first end of the lower supporter and placed at a second end thereof on a predetermined position of the lower supporter spaced to the first side from an intermediate line of the lower supporter. The first piezoelectric layer has a first thin-film piezoelectric material layer to generate a vertical actuating force by shrinking and expanding when a voltage is applied to the first thin-film piezoelectric material layer, thus reflecting or diffracting incident light. The hybrid light modulator further includes a second piezoelectric layer placed at a second end thereof on a second end of the lower supporter and placed at a first end thereof on a predetermined position of the lower supporter spaced to the second side from the intermediate line of the lower supporter. The second piezoelectric layer has a second thin-film piezoelectric material layer to generate a vertical actuating force by shrinking and expanding when a voltage is applied to both sides of the second thin-film piezoelectric material layer, thus reflecting or diffracting incident light. The hybrid light modulator further includes a mirror layer formed on the intermediate portion of the lower supporter between the first and second piezoelectric layers while being stepped from the first and second piezoelectric layers, thus reflecting or diffracting incident light.

In still another aspect, the present invention provides a hybrid light modulator, including a substrate having an insulating layer formed on an upper surface thereof; and a lower supporter having a ribbon shape and attached at both ends thereof to the substrate while being spaced at an intermediate portion thereof from the substrate by a predetermined distance. The lower supporter is vertically movable at the intermediate portion thereof, which is spaced from the substrate. The hybrid light modulator further includes a piezoelectric mirror layer laminated on the lower supporter such that both ends of the piezoelectric mirror layer are placed on the intermediate portion of the lower supporter spaced from the substrate, and having a thin-film piezoelectric material layer, so that a predetermined portion of the piezoelectric mirror layer spaced from the substrate moves vertically when voltage is applied to the thin-film piezoelectric material layer, thus reflecting or diffracting incident light; a first mirror layer laminated on a first end of the lower supporter while being stepped from the piezoelectric mirror layer, thus reflecting or diffracting incident light; and a second mirror layer laminated on a second end of the lower supporter while being stepped from the piezoelectric mirror layer, thus reflecting or diffracting incident light.

In still another aspect, the present invention provides a hybrid light modulator, including a substrate having an insulating layer formed on an upper surface thereof; a lower supporter having a ribbon shape and attached at both ends thereof to the substrate while being spaced at an intermediate portion thereof from the substrate by a predetermined distance; and a first piezoelectric layer placed at a first end thereof on a first end of the lower supporter and placed at a second end thereof on a predetermined position of the lower supporter spaced to the first side from an intermediate line of the lower supporter. The first piezoelectric layer has a first thin-film piezoelectric material layer to generate a vertical actuating force by shrinking and expanding when a voltage is applied to the first thin-film piezoelectric material layer, thus reflecting or diffracting incident light. The hybrid light modulator further includes a second piezoelectric layer placed at a second end thereof on a second end of the lower supporter and placed at a first end thereof on a predetermined position of the lower supporter spaced to the second side from the intermediate line of the lower supporter. The second piezoelectric layer has a second thin-film piezoelectric material layer to generate a vertical actuating force by shrinking and expanding when a voltage is applied to both sides of the second thin-film piezoelectric material layer, thus reflecting or diffracting incident light. The hybrid light modulator further includes a mirror layer formed on the intermediate portion of the lower supporter between the first and second piezoelectric layers while being stepped from the first and second piezoelectric layers, thus reflecting or diffracting incident light.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
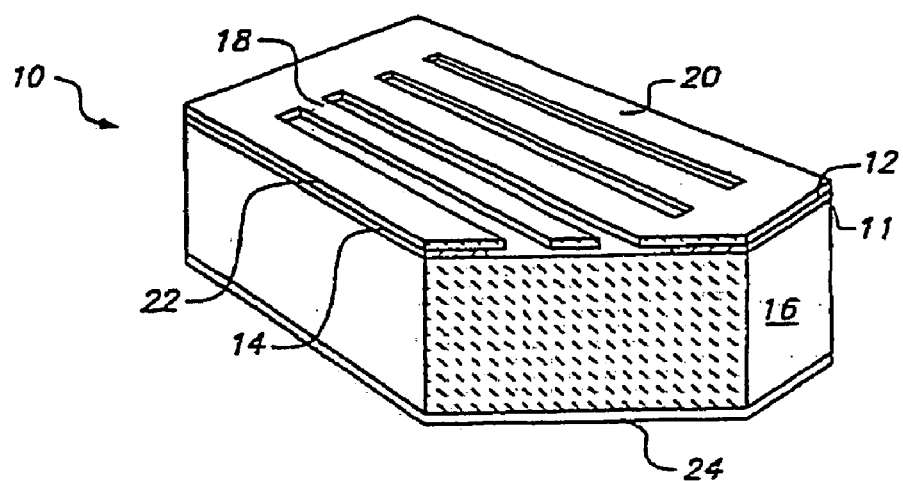
FIG. 1 illustrates an electrostatic-type grating light modulator according to a conventional technology.
Figure 2:
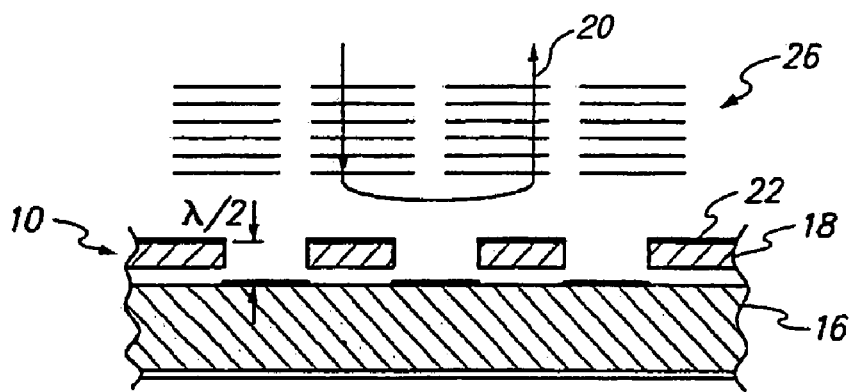
FIG. 2 illustrates reflection of incident light by the electrostatic-type grating light modulator according to a conventional technology in an undeformed state.
Figure 3:
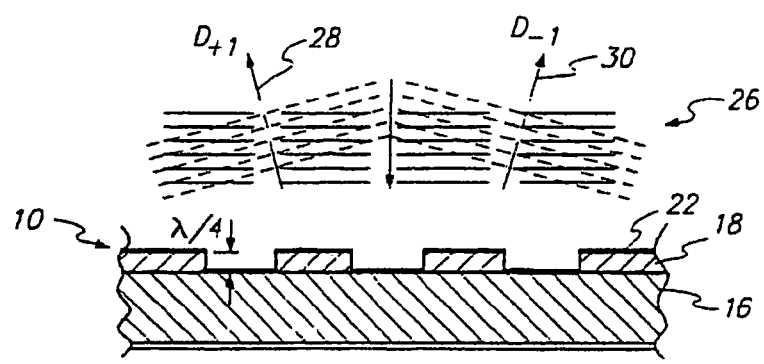
FIG. 3 illustrates diffraction of incident light by the grating light modulator, in a deformed state due to an electrostatic force, according to a conventional technology.
Figure 4:
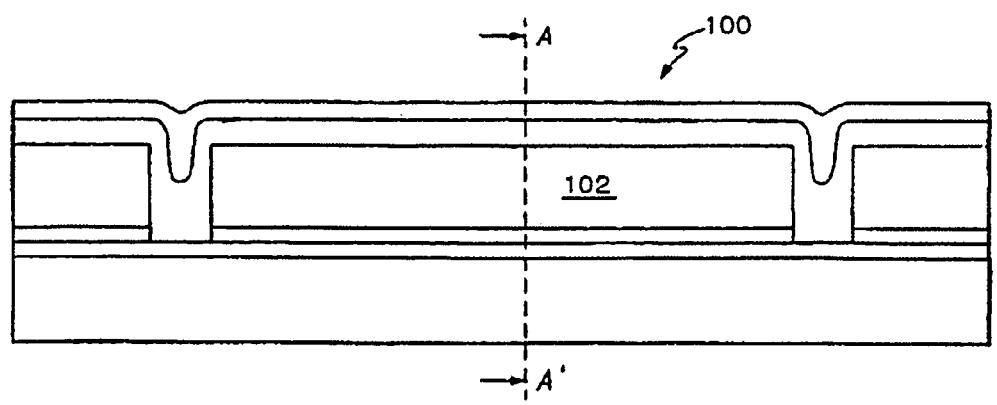
Figure 5:
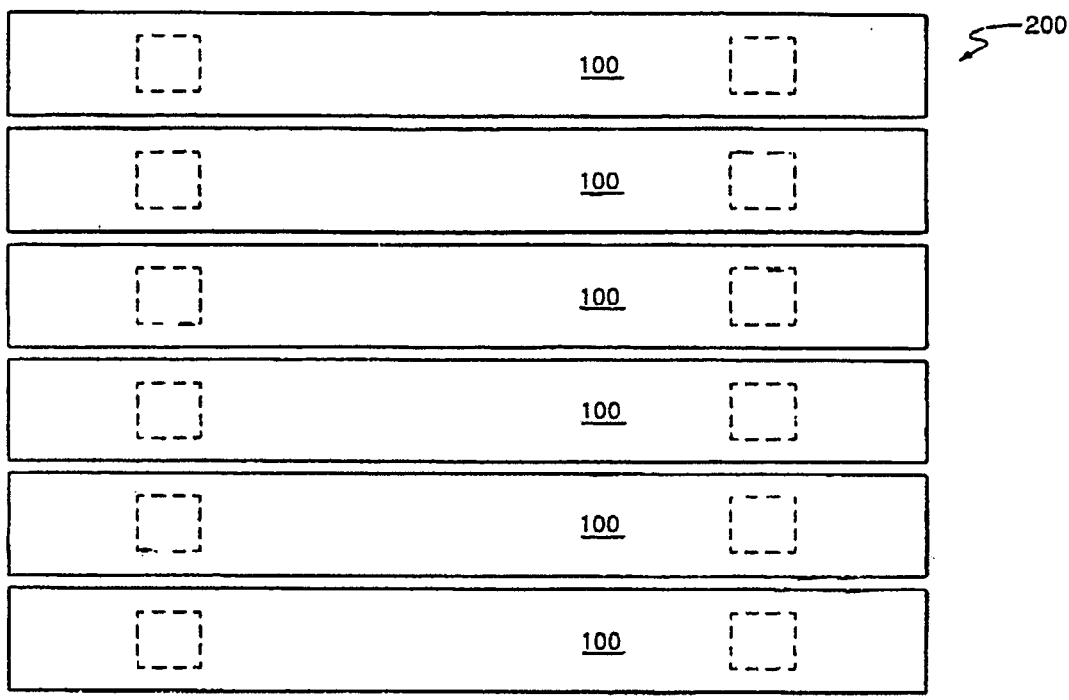
Figure 6:
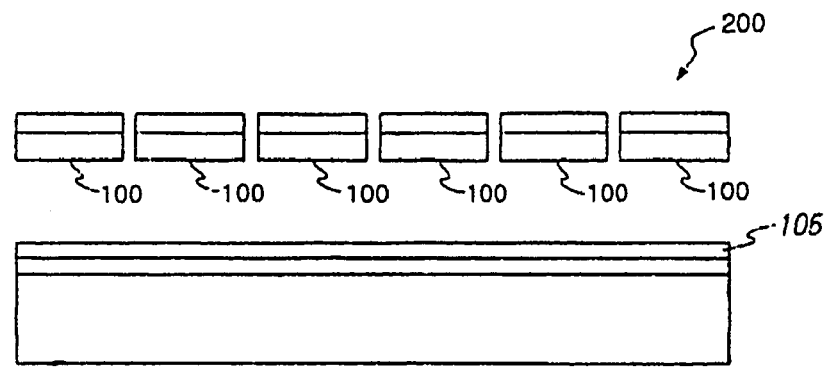
Figure 7:
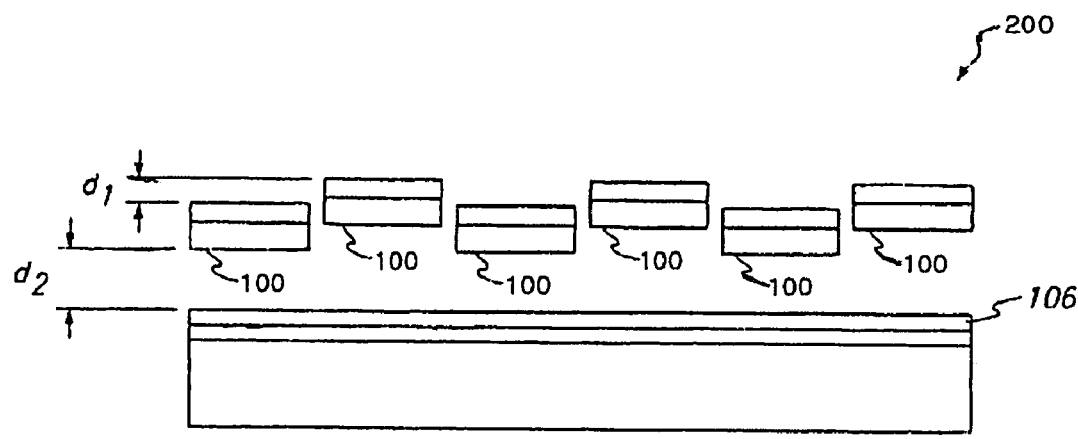

Hereinafter, embodiments of the present invention will be described in detail with reference to the attached drawings.

Reference now should be made to the drawings, in which the same reference numerals are used throughout the different drawings to designate the same or similar components.

FIGS. 8a through 8f are perspective views of hybrid light modulators having elements, according to first through sixth embodiments of the present invention, respectively.

Figure 8A:
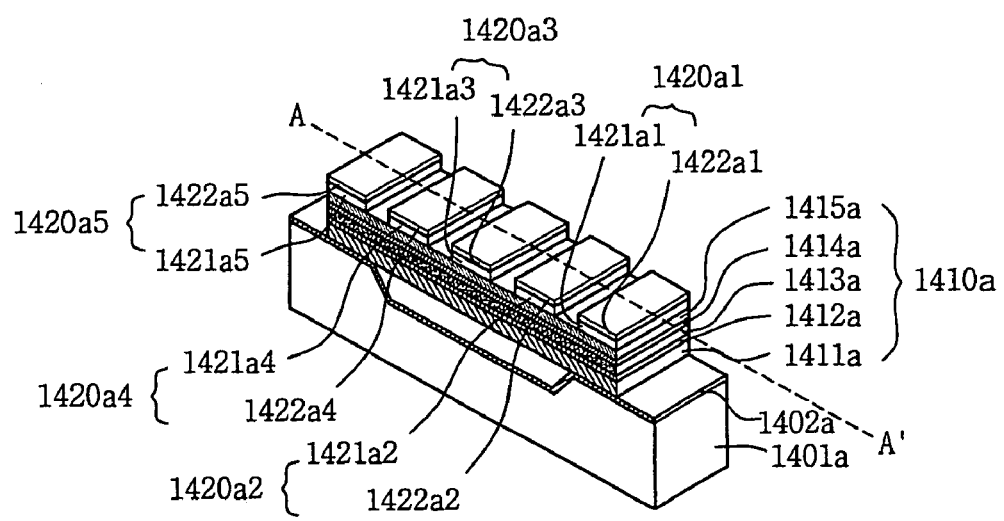
FIGS. 8a through 8f are partial perspective views of hybrid light modulators having elements, according to first through sixth embodiment of the present invention, respectively.

FIG. 8a is a perspective view showing an element 1410a of a recess-type hybrid thin-film piezoelectric light modulator, according to a first embodiment of the present invention. Referring to FIG. 8a, the element 1410a includes a plurality of protrusions 1420a1, 1420a2, 1420a3, 1420a4 and 1420a5 which is placed on a micromirror layer 1415a of the element 1410a to reflect and diffract incident light. Each of the protrusions 1420a1, 1420a2, 1420a3, 1420a4 and 1420a5 has a rectangular column shape (ribbon shape). The protrusions 1420a1, 1420a2, 1420a3, 1420a4 and 1420a5 are arranged along a longitudinal axis of the element 1410a, passing over the recess, to be spaced apart from each other at regular intervals (for example, each interval is the same as the width of the protrusion 1420a1, 1420a2, 1420a3, 1420a4, 1420a5). Each protrusion 1420a1, 1420a2, 1420a3, 1420a4, 1420a5 includes a support layer 1421a1, 1421a2, 1421a3, 1421a4, 1421a5 which is attached at a lower surface thereof to an upper surface of the micromirror layer 1415a of the element 1410a. Each protrusion 1420a1, 1420a2, 1420a3, 1420a4, 1420a5 further includes a mirror layer 1422a1, 1422a2, 1422a3, 1422a4, 1422a5 which is layered on the support layer 1421a1, 1421a2, 1421a3, 1421a4, 1421a5 to reflect and diffract incident light.

Figure 9A:
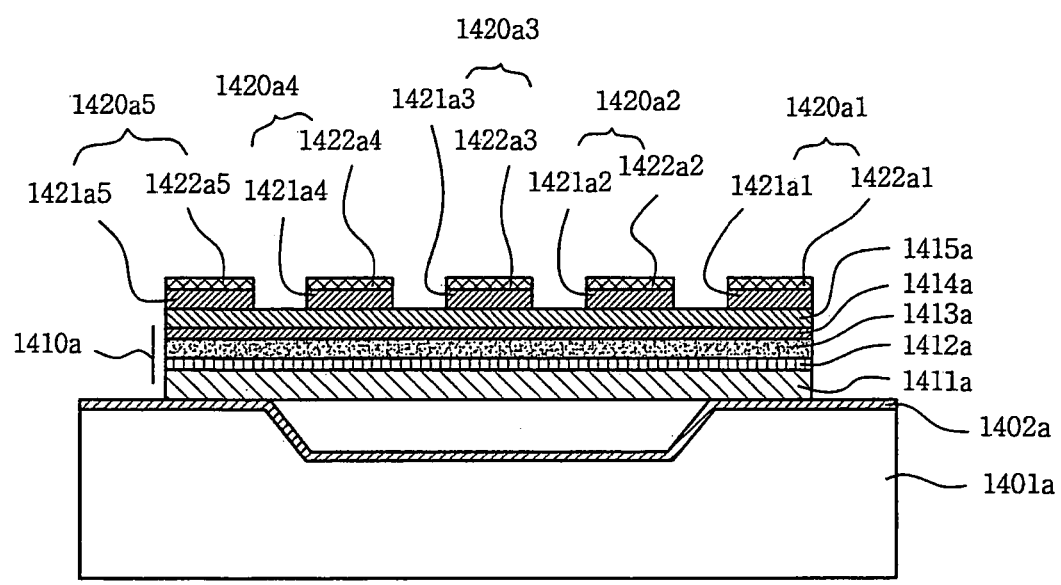
FIGS. 9a through 9f are sectional views of the hybrid light modulators having the elements of FIGS. 8a through 8f respectively.

At this time, one pixel is formed by both the mirror layer 1422a1, 1422a2, 1422a3, 1422a4, 1422a5 of one protrusion 1420a1, 1420a2, 1420a3, 1420a4, 1420a5 and one part of the micromirror layer 1415a of the element 1410a exposed from the protrusions 1420a1, 1420a2, 1420a3, 1420a4 and 1420a5. Therefore, in the hybrid light modulator of FIG. 8a, two or more pixels are embodied in a single element 1410a, thus realizing miniaturization and high integration of the hybrid light modulator. FIG. 9a is a sectional view taken along the line A–A' of FIG. 8a. With reference to FIG. 9a, the arrangement of the protrusions 1420a1, 1420a2, 1420a3, 1420a4 and 1420a5 along the longitudinal axis of the element 1410a *will be distinctly understood.*

In the hybrid light modulator of FIG. 8a, a plurality of elements 1410a having regular widths are arranged at regular intervals to constitute the hybrid light modular. Alternatively, the elements 1410a having different widths may alternate to constitute the hybrid light modulator. As a further alternative, the elements 1410a may be spaced apart from each other at regular intervals (each interval is almost the same as the width of each element 1410a), in which a micromirror layer formed on an upper side of a silicon substrate 1401a reflects and diffracts incident light.

The silicon substrate 1401a has a recess to provide an air space to the elements 1410a. An insulating layer 1402a is deposited on an upper surface of the silicon substrate 1401a. Both ends of the elements 1410a are attached to upper sides of a wall of the recess.

The elements 1410a each have a ribbon shape. Lower sides of the both ends of the elements 1410a are attached to the remaining upper side of the silicon substrate 1401a except for the recess so that the centers of the elements 1410a are spaced from the recess of the silicon substrate 1401a. The micromirror layer 1415a is formed on an upper side of each element 1410a. Additionally, each element 1410a includes a lower supporter 1411a which has a vertically movable portion corresponding in position to the recess of the silicon substrate 1401a.

Furthermore, the element 1410a includes a lower electrode layer 1412a which is laminated on the lower supporter 1411a to provide a piezoelectric voltage, and a piezoelectric material layer 1413a which is laminated on the lower electrode layer 1412a and shrinks and expands to generate a vertical actuating force when voltage is applied to upper and lower surfaces thereof. The element 1410a further includes an upper electrode layer 1414a which is laminated on the piezoelectric material layer 1413a and provides a piezoelectric voltage to the piezoelectric material layer 1413a. The element 1410a further includes the micromirror layer 1415a which is laminated on the upper electrode layer 1414a to reflect and diffract incident light.

Figure 8B:
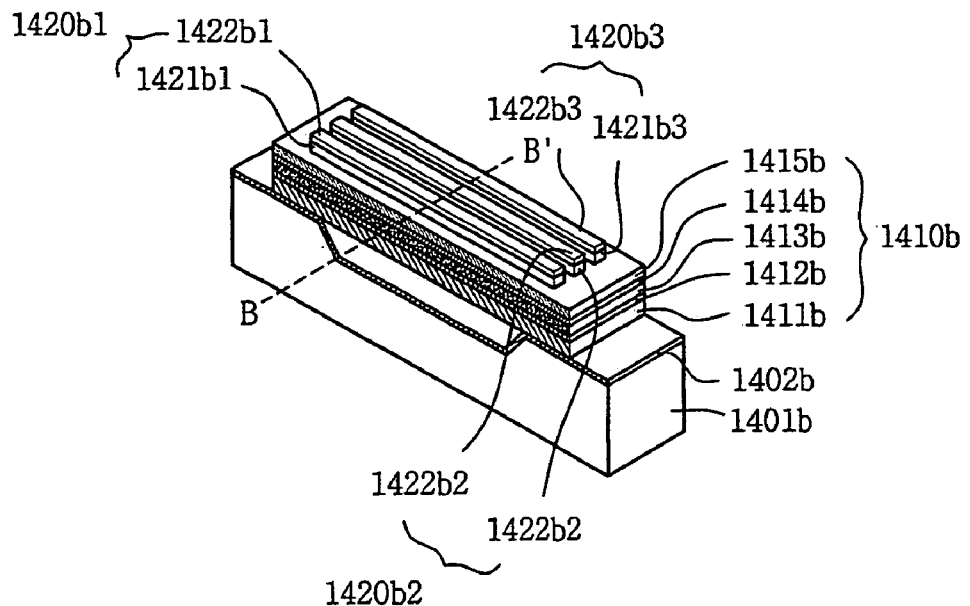

FIG. 8b is a perspective view showing an element 1410b of a recess-type hybrid thin-film piezoelectric light modulator, according to a second embodiment of the present invention. Referring to FIG. 8b, the element 1410b includes a plurality of protrusions 1420b1, 1420b2 and 1420b3 which is placed on a micromirror layer 1415b of the element 1410b that reflects and diffracts incident light. Each protrusion 1420b1, 1420b2, 1420b3 has a rectangular column shape (ribbon shape). When the longitudinal axis of the element 1410b is defined as the axis passing over the recess, the protrusions 1420b1, 1420b2 and 1420b3 are arranged along a latitudinal axis of the element 1410b, unlike the element

1410*a* of FIG. 8*a*. The protrusions 1420*b*1, 1420*b*2 and 1420*b*3 are spaced apart from each other at regular intervals (for example, each interval is the same as the width of the protrusion 1420*b*1, 1420*b*2, 1420*b*3). Each protrusion 1420*b*1, 1420*b*2, 1420*b*3 includes a support layer 1421*b*1, 1421*b*2, 1421*b*3 which is attached at a lower surface thereof to an upper surface of the micromirror layer 1415*b* of the element 1410*b*. Each protrusion 1420*b*1, 1420*b*2, 1420*b*3 further includes a mirror layer 1422*b*1, 1422*b*2, 1422*b*3 which is layered on the support layer 1421*b*1, 1421*b*2, 1421*b*3 to reflect and diffract incident light.

Figure 9B:
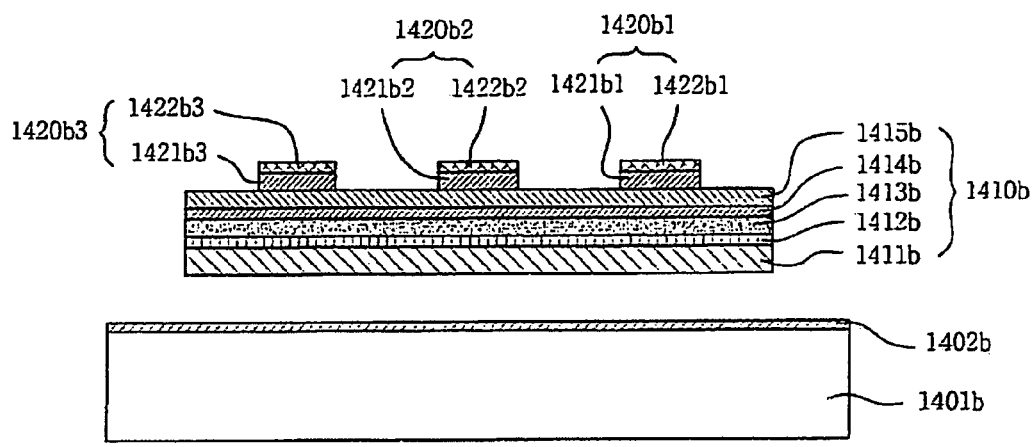

At this time, one pixel is formed by both the mirror layer 1422*b*1, 1422*b*2, 1422*b*3 of one protrusion 1420*b*1, 1420*b*2, 1420*b*3 and one part of the micromirror layer 1415*b* of the element 1410*b* exposed from the protrusions 1420*b*1, 1420*b*2 and 1420*b*3. Therefore, in the hybrid light modulator of FIG. 8*b*, two or more pixels are embodied in a single element 1410*b*, thus realizing miniaturization and high integration of the hybrid light modulator. FIG. 9*b* is a sectional view taken along the line B–B' of FIG. 8*b*. With reference to FIG. 9*b*, the arrangement of the protrusions 1420*b*1, 1420*b*2 and 1420*b*3 along the latitudinal axis of the element 1410*b* will be distinctly understood. Furthermore, the construction of the element 1410*b* of the second embodiment is the same as that of the element 1410*a* of the first embodiment, therefore further explanation is deemed unnecessary.

Figure 8C:
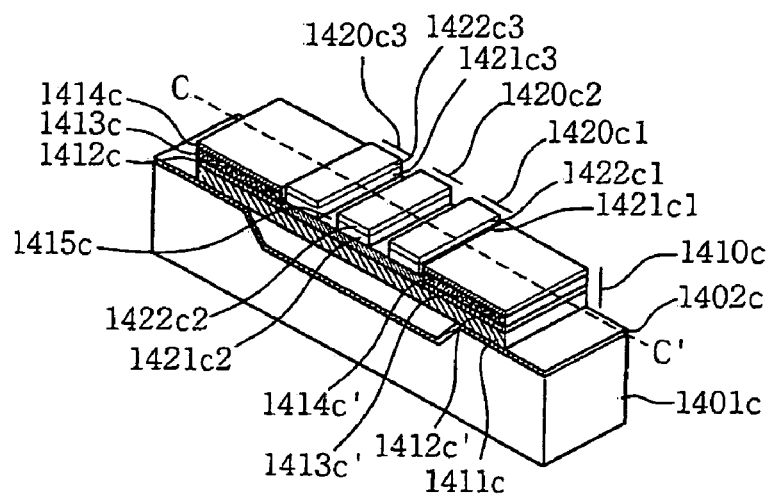
Figure 8D:
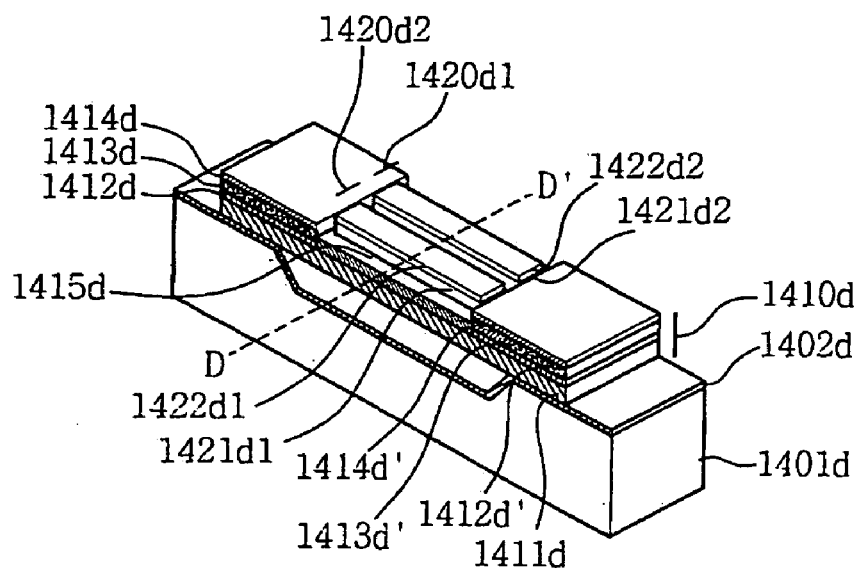

FIG. 8*c* is a perspective view showing an element 1410*c* of a recess-type hybrid thin-film piezoelectric light modulator, according to a third embodiment of the present invention. Referring to FIG. 8*c*, the element 1410*c* includes a plurality of protrusions 1420*c*1, 1420*c*2 and 1420*c*3 which is placed on a micromirror layer 1415*c* of the element 1410*c* that reflects and diffracts incident light. Each protrusion 1420*c*1, 1420*c*2, 1420*c*3 has a rectangular column shape (ribbon shape). The protrusions 1420*c*1, 1420*c*2 and 1420*c*3 are arranged along a longitudinal axis of the element 1410*c*, passing over the recess, to be spaced apart from each other at regular intervals (for example, each interval is the same as the width of the protrusion 1420*c*1, 1420*c*2, 1420*c*3). Each protrusion 1420*c*1, 1420*c*2, 1420*c*3 includes a support layer 1421*c*1, 1421*c*2, 1421*c*3 which is attached at a lower surface thereof to an upper surface of the micromirror layer 1415*c* of the element 1410*c*. The protrusion 1420*c*1, 1420*c*2, 1420*c*3 further includes a mirror layer 1422*c*1, 1422*c*2, 1422*c*3 which is layered on the support layer 1421*c*1, 1421*c*2, 1421*c*3 to reflect and diffract incident light.

Figure 9C:
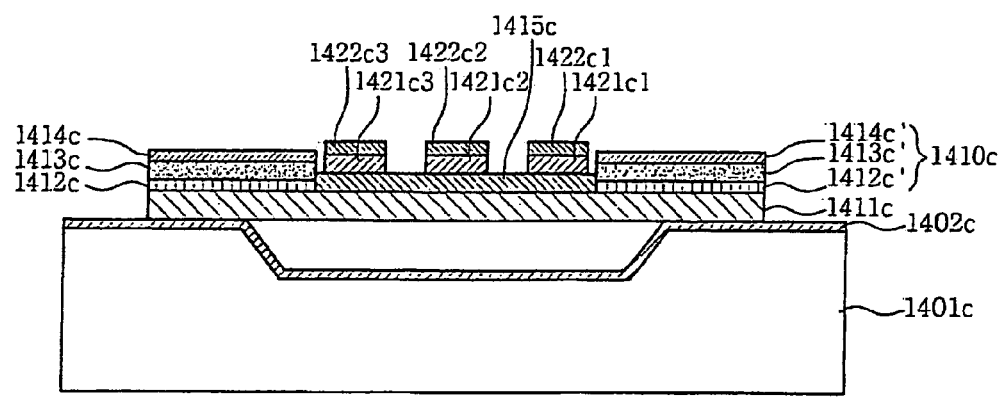

At this time, one pixel is formed by both the mirror layer 1422*c*1, 1422*c*2, 1422*c*3 of one protrusion 1420*c*1, 1420*c*2, 1420*c*3 and one part of the micromirror layer 1415*c* of the element 1410*c* exposed from the protrusions 1420*c*1, 1420*c*2 and 1420*c*3. Therefore, in the hybrid light modulator of FIG. 8*c*, two or more pixels are embodied in a single element 1410*c*, thus realizing miniaturization and high integration of the hybrid light modulator. FIG. 9*c* is a sectional view taken along the line C–C' of FIG. 8*c*. With reference to FIG. 9*c*, the arrangement of the protrusions 1420*c*1, 1420*c*2 and 1420*c*3 along the longitudinal axis of the element 1410*c* will be distinctly understood.

In the hybrid light modulator of FIG. 8*c*, a plurality of elements 1410*c* having regular widths is arranged at regular intervals to constitute the hybrid light modular. Alternatively, elements 1410*c* having different widths may alternate to constitute the hybrid light modulator. As a further alternative, the elements 1410*c* may be spaced apart from each other at regular intervals (each interval is almost the same as the width of each element 1410*c*), in which a micromirror layer formed on an upper side of a silicon substrate 1401*c* reflects and diffracts incident light.

The silicon substrate 1401*c* has a recess to provide an air space to the elements 1410*c*. An insulating layer 1402*c* is deposited on an upper surface of the silicon substrate 1401*c*. Both ends of the elements 1410*c* are attached to upper sides of a wall of the recess.

The elements 1410*c* each have a ribbon shape. Lower sides of both ends of the elements 1410*c* are attached to the remaining upper side of the silicon substrate 1401*c* except for the recess so that the centers of the elements 1410*c* are spaced from the recess of the silicon substrate 1401*c*. Additionally, each element 1410*c* includes a lower supporter 1411*c* which has a vertically movable portion corresponding in position to the recess of the silicon substrate 1401*c*.

Furthermore, the element 1410*c* includes a first lower electrode layer 1412*c* which is laminated on a first end of the lower supporter 1411*c* to provide a piezoelectric voltage, and a first piezoelectric material layer 1413*c* which is laminated on the first lower electrode layer 1412*c* and shrinks and expands to generate a vertical actuating force when a voltage is applied to upper and lower surfaces thereof. The element 1410*c* further includes a first upper electrode layer 1414*c* which is laminated on the first piezoelectric material layer 1413*c* and provides a piezoelectric voltage to the first piezoelectric material layer 1413*c*.

In addition, the element 1410*c* includes a second lower electrode layer 1412*c*' which is laminated on a second end of the lower supporter 1411*c* to provide a piezoelectric voltage, and a second piezoelectric material layer 1413*c*' which is laminated on the second lower electrode layer 1412*c*' and shrinks and expands to generate a vertical actuating force when voltage is applied to upper and lower surfaces thereof. The element 1410*c* further includes a second upper electrode layer 1414*c*' which is laminated on the second piezoelectric material layer 1413*c*' and provides a piezoelectric voltage to the second piezoelectric material layer 1413*c*'.

FIG. 8*b* is a perspective view showing an element 1410*b* of a recess-type hybrid thin-film piezoelectric light modulator, according to a fourth embodiment of the present invention. Referring to FIG. 8*a*, the element 1410*a* includes a plurality of protrusions 1420*d*1 and 1420*d*2 which is placed on a micromirror layer 1415*d* of the element 1410*d* that reflects and diffracts incident light. Each protrusion 1420*d*1, 1420*d*2 has a rectangular column shape (ribbon shape). When the longitudinal axis of the element 1410*d* is defined as the axis passing over the recess, the protrusions 1420*d*1 and 1420*d*2 are arranged along a latitudinal axis of the element 1410*d*, unlike the element 1410*c* of FIG. 8*c*. The protrusions 1420*d*1 and 1420*d*2 are spaced apart from each other at regular intervals (for example, each interval is the same as the width of the protrusion 1420*d*1, 1420*d*2). Each protrusion 1420*d*1, 1420*d*2 includes a support layer 1421*d*1, 1421*d*2 which is attached at a lower surface thereof to an upper surface of the micromirror layer 1415*d* of the element 1410*d*. The protrusion 1420*d*1, 1420*d*2 further includes a mirror layer 1422*d*1, 1422*d*2 which is layered on the support layer 1421*d*1, 1421*d*2 to reflect and diffract incident light.

Figure 9D:
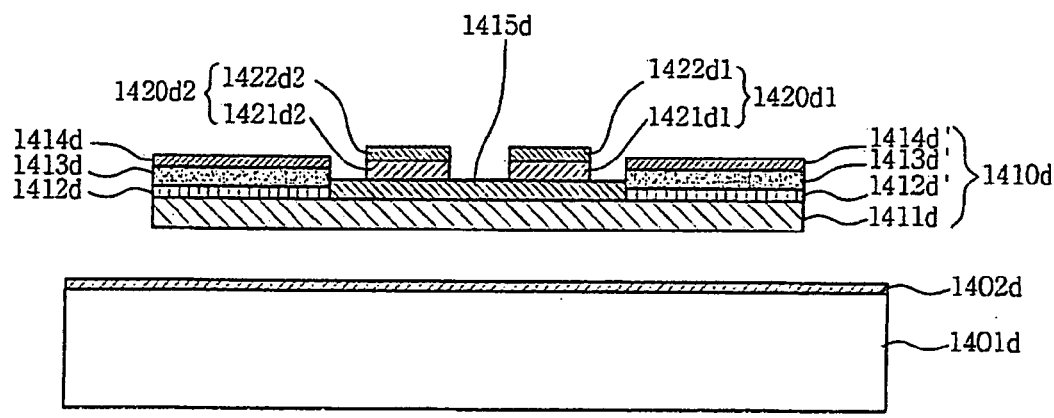

At this time, one pixel is formed by both the mirror layer 1422*d*1, 1422*d*2 of one protrusion 1420*d*1, 1420*d*2 and one part of the micromirror layer 1415*d* of the element 1410*d* exposed from the protrusions 1420*d*1 and 1420*d*2. Therefore, in the hybrid light modulator of FIG. 8*d*, two pixels are embodied in a the single element 1410*d*, thus realizing miniaturization and high integration of the hybrid light modulator. FIG. 9*d* is a sectional view taken along the line D–D' of FIG. 8*d*. With reference to FIG. 9*d*, the arrangement of the protrusions 1420d1 and 1420d2 along the latitudinal axis of the element 1410d will be distinctly understood. Furthermore, the construction of the element 1410d of the fourth embodiment is the same as that of the element 1410c of the third embodiment, therefore further explanation is deemed unnecessary.

Figure 8E:
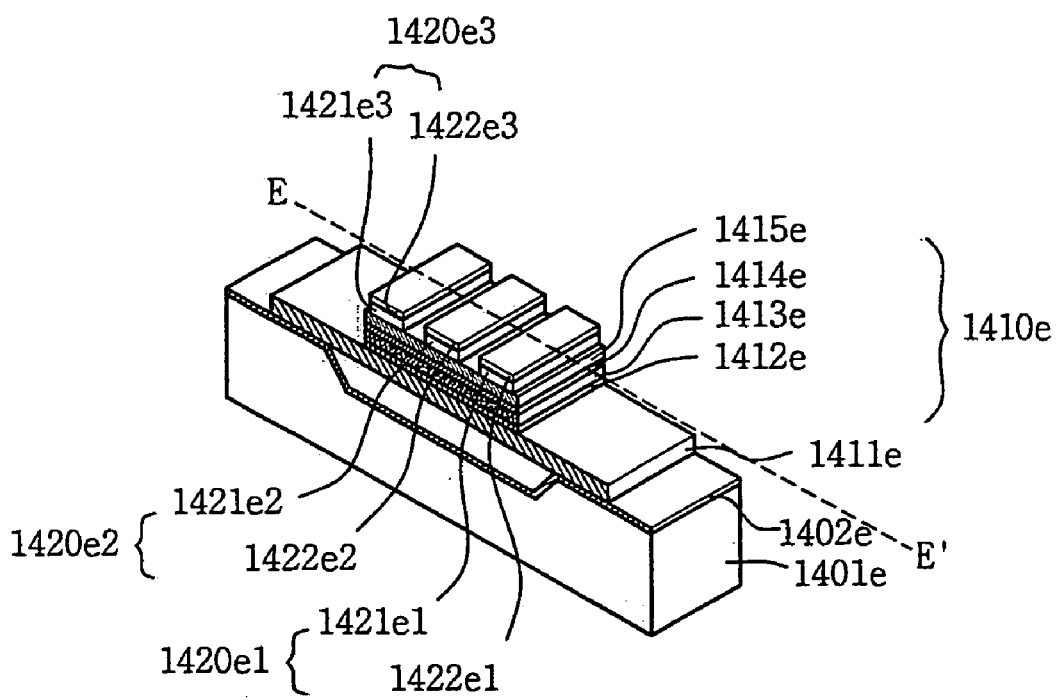

FIG. 8e is a perspective view showing an element 1410e of a recess-type hybrid thin-film piezoelectric light modulator, according to a fifth embodiment of the present invention. Referring to FIG. 8e, the element 1410e includes a plurality of protrusions 1420e1, 1420e2 and 1420e3 which is placed on a micromirror layer 1415e of the element 1410e that reflects and diffracts incident light. Each of the protrusions 1420e1, 1420e2 and 1420e3 has a rectangular column shape (ribbon shape). The protrusions 1420e1, 1420e2 and 1420e3 are arranged along a longitudinal axis of the element 1410e, passing over the recess, to be spaced apart from each other at regular intervals (for example, each interval is the same as the width of the protrusion 1420e1, 1420e2, 1420e3). Each protrusion 1420e1, 1420e2, 1420e3 includes a support layer 1421e1, 1421e2, 1421e3 which is attached at a lower surface thereof to an upper surface of the micromirror layer 1415e of the element 1410e. The protrusion 1420e1, 1420e2, 1420e3 further includes a mirror layer 1422e1, 1422e2, 1422e3 which is layered on the support layer 1421e1, 1421e2, 1421e3, respectively, to reflect and diffract incident light.

Figure 9E:
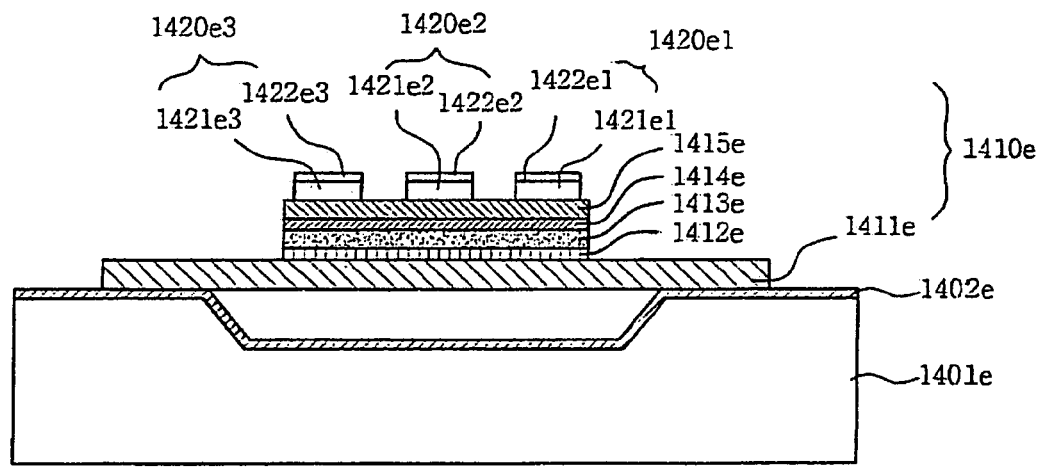

At this time, one pixel is formed by both the mirror layer 1422e1, 1422e2, 1422e3 of one protrusion 1420e1, 1420e2, 1420e3 and one part of the micromirror layer 1415e of the element 1410e exposed from the protrusions 1420e1, 1420e2 and 1420e3. Therefore, in the hybrid light modulator of FIG. 8e, two or more pixels are embodied in a single element 1410e, thus realizing miniaturization and high integration of the hybrid light modulator. FIG. 9e is a sectional view taken along the line E–E' of FIG. 8e. With reference to FIG. 9e, the arrangement of the protrusions 1420e1, 1420e2 and 1420e3 along the longitudinal axis of the element 1410e will be understood.

In the hybrid light modulator of FIG. 14e, a plurality of elements 1410e having regular widths are arranged at regular intervals to constitute the hybrid light modulator. Alternatively, the elements 1410e having different widths may alternate to constitute the hybrid light modulator. As a further alternative, the elements 1410e may be spaced apart from each other at regular intervals (each interval is almost the same as the width of each element 1410e), in which a micromirror layer formed on an upper side of a silicon substrate 1401e reflects and diffracts incident light.

The silicon substrate 1401e has a recess to provide an air space to the elements 1410e. An insulating layer 1402e is deposited on an upper surface of the silicon substrate 1401e. Both ends of the elements 1410e are attached to upper sides of a wall of the recess.

The elements 1410e each have a ribbon shape. Lower sides of the both ends of the elements 1410e are attached to the remaining upper side of the silicon substrate 1401e except for the recess so that the centers of the elements 1410e are spaced from the recess of the silicon substrate 1401e. The micromirror layer 1415e is formed on an upper side of each element 1410e above the recess of the silicon substrate 1401e. That is, portions of the micromirror layer 1415e, which are aligned with the remaining upper side of the silicon substrate 1401e other than the recess, are removed by an etching process. Additionally, each element 1410e includes a lower supporter 1411e which has a vertically movable portion corresponding in position to the recess of the silicon substrate 1401e.

Furthermore, the element 1410e includes a lower electrode layer 1412e which is laminated on the lower supporter 1411e above the recess of the silicon substrate 1401e to provide a piezoelectric voltage. At this time, portions of the lower electrode layer 1412e, which are aligned with the remaining upper side of the silicon substrate 1401e other than the recess, are removed by an etching process. The element 1410e further includes a piezoelectric material layer 1413e which is laminated on the lower electrode layer 1412e and shrinks and expands to generate a vertical actuating force when voltage is applied to upper and lower surfaces thereof. The element 1410e further includes an upper electrode layer 1414e which is laminated on the piezoelectric material layer 1413e and provides a piezoelectric voltage to the piezoelectric material layer 1413e. The element 1410e further includes the micromirror layer 1415e which is laminated on the upper electrode layer 1414e to reflect and diffract incident light.

Figure 8F:
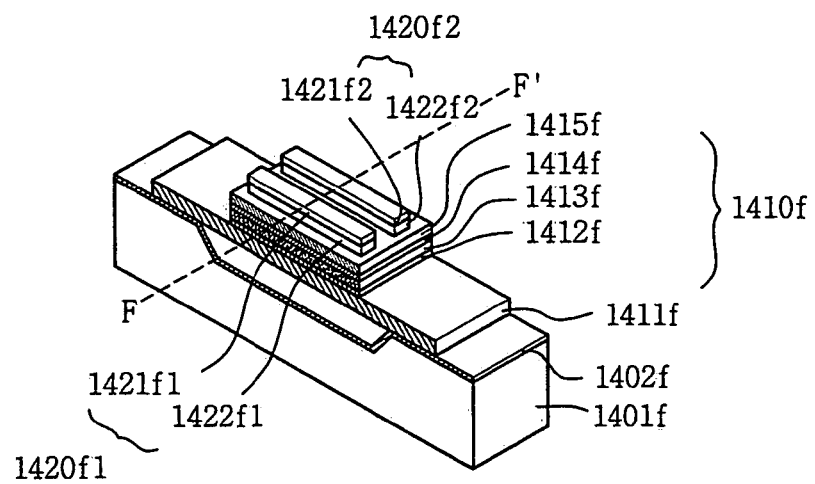

FIG. 8f is a perspective view showing an element 1410f of a recess-type hybrid thin-film piezoelectric light modulator, according to a sixth embodiment of the present invention. Referring to FIG. 8f, the element 1410f includes a plurality of protrusions 1420f1 and 1420f2 which is placed on a micromirror layer 1415f of the element 1410f that reflects and diffracts incident light. Each protrusion 1420f1, 1420f2 has a rectangular column shape (ribbon shape). When it is defined that the longitudinal axis of the element 1410f is aligned with the direction passing over the recess, the protrusions 1420f1 and 1420f2 are arranged along a latitudinal axis of the element 1410f, unlike the element 1410e of FIG. 8e. The protrusions 1420f1 and 1420f2 are spaced apart from each other at regular intervals (for example, each interval is the same as the width of the protrusion 1420f1, 1420f2). Each protrusion 1420f1, 1420f2 includes a support layer 1421f1, 1421f2 which is attached at a lower surface thereof to an upper surface of the micromirror layer 1415f of the element 1410f. The protrusion 1420f1, 1420f2 further includes a mirror layer 1422f1, 1422f2 which is layered on the support layer 1421f1, 1421f2 to reflect and diffract incident light.

Figure 9F:
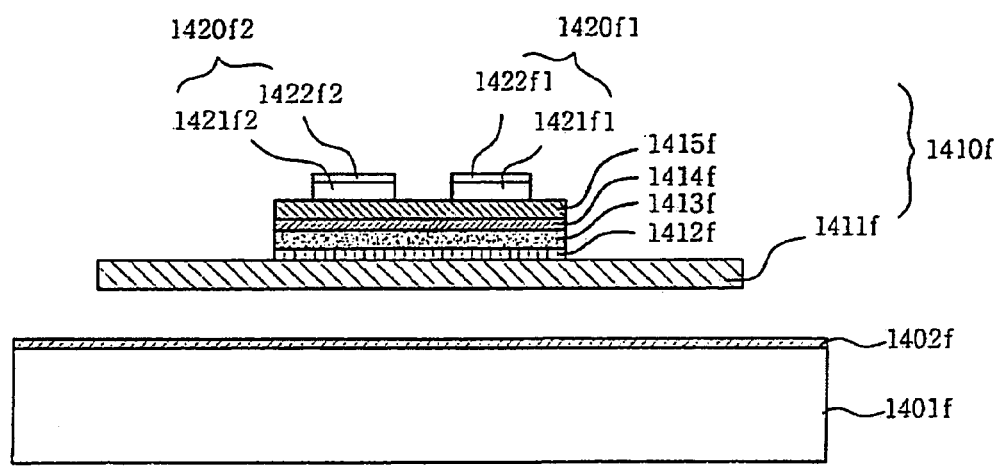

At this time, one pixel is formed by both the mirror layer 1422f1, 1422f2 of one protrusion 1420f1, 1420f2 and one part of the micromirror layer 1415f of the element 1410f exposed from the protrusions 1420f1 and 1420f2. Therefore, in the hybrid light modulator of FIG. 8f, two pixels are embodied in a single element 1410f, thus realizing miniaturization and high integration of the hybrid light modulator. FIG. 9f is a sectional view taken along the line F–F' of FIG. 8f. Reference to FIG. 9f, the arrangement of the protrusions 1420f1 and 1420f2 along the latitudinal axis of the element 1410f will be distinctly understood. Furthermore, the construction of the element 1410f of the sixth embodiment is the same as that of the element 1410e of the fifth embodiment, therefore further explanation is deemed unnecessary.

In the meantime, the element 1410a, 1410b, 1410c, 1410d, 1410e, 1410f of each of the hybrid light modulators according to the first through sixth embodiments of FIGS. 8a through 8f can be easily adapted to a protrusion-type diffractive thin-film piezoelectric light modulator disclosed in U.S. patent application Ser. No. 10/952,246, entitled "Diffractive Thin-Film Piezoelecric Light Modulator and a Method of Producing the Same," incorporated herein by reference.

Figure 10:
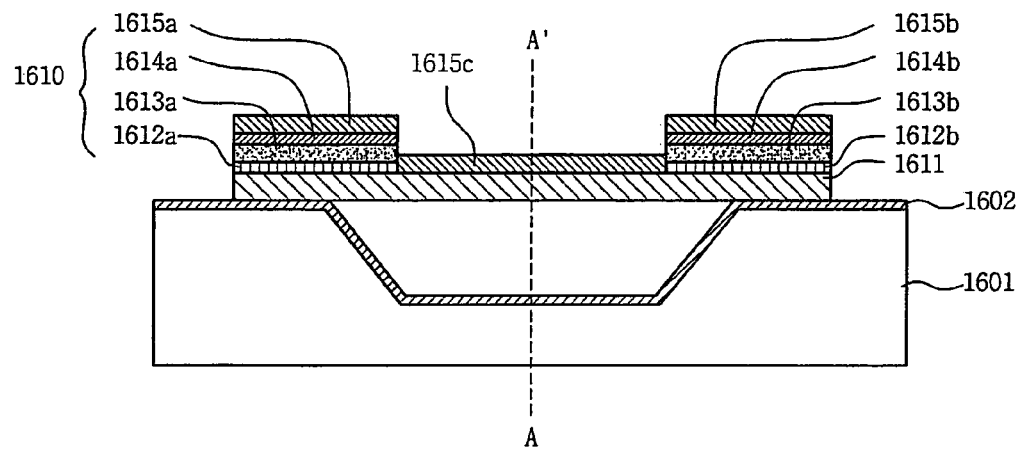
FIG. 10 is a sectional view of a hybrid light modulator, according to a seventh embodiment of the present invention.

FIG. 10 is a sectional view of a hybrid light modulator, according to a seventh embodiment of the present invention.

Referring to FIG. 10, an element 1610 of the hybrid light modulator according to the seventh embodiment is placed on a silicon substrate 1601 while being partially spaced from a bottom of a recess of the silicon substrate 1601. The element 1610 includes a lower supporter 1611 which is attached at both ends thereof to the silicon substrate 1601 along upper ends of sidewalls of the recess. The element 1610 further includes a first lower electrode layer 1612a which is laminated on a first end of the lower supporter 1611 such that a first end of the first lower electrode layer 1612a is aligned with the first end of the lower supporter 1611 and a second end of the first lower electrode layer 1612a is placed on a predetermined position of the lower supporter 1611 spaced to the first side from the center line of the recess. The element 1610 further includes a first piezoelectric material layer 1613a which is laminated on the first lower electrode layer 1612a and generates a vertical actuating force when voltage is applied to the first lower electrode layer 1613a. The element 1610 further includes a first upper electrode layer 1614a which is laminated on the first piezoelectric material layer 1613a and provides a piezoelectric voltage to the first piezoelectric material layer 1613a. The element 1610 further includes the first micromirror layer 1615a which is laminated on the first upper electrode layer 1614a to reflect and diffract incident light.

The element 1610 further includes a third micromirror layer 1615c which is laminated on an intermediate portion of the lower supporter 1611 to reflect and diffract incident light.

The element 1610 further includes a second lower electrode layer 1612b which is laminated on a second end of the lower supporter 1611 such that a second end of the second lower electrode layer 1612b is aligned with the second end of the lower supporter 1611 and a first end of the second lower electrode layer 1612b is placed on a predetermined position of the lower supporter 1611 spaced to the second side from the center line of the recess. The element 1610 further includes a second piezoelectric material layer 1613b which is laminated on the second lower electrode layer 1612b and generates a vertical actuating force when a voltage is applied to the second lower electrode layer 1613b. The element 1610 further includes a second upper electrode layer 1614b which is laminated on the second piezoelectric material layer 1613b and provides a piezoelectric voltage to the second piezoelectric material layer 1613b. The element 1610 further includes the second micromirror layer 1615b which is laminated on the second upper electrode layer 1614b to reflect and diffract incident light.

In the hybrid light modulator of FIG. 10, one pixel is formed by both the first micromirror layer 1615a and a part of the third micromirror layer 1615c which is placed to the first side based on the line A–A' of FIG. 10. The other pixel is formed by both the second micromirror layer 1615b and a part of the third micromirror layer 1615c which is placed to the second side based on the line A–A' of FIG. 16. As a result, two pixels are embodied in a single element 1610.

Figure 11:
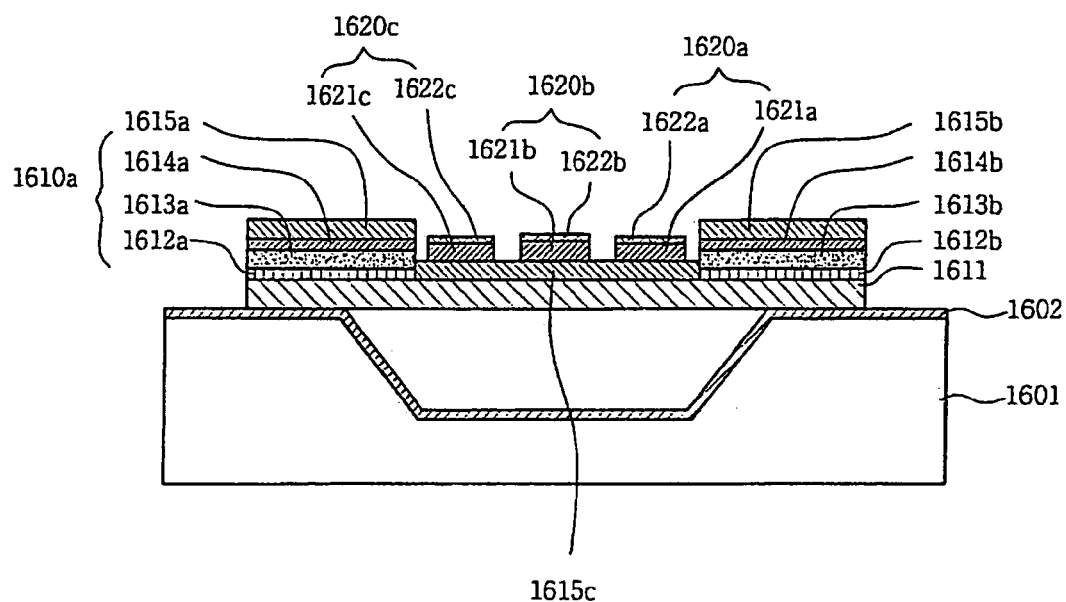
FIG. 11 is a sectional view of a hybrid light modulator, according to an eighth embodiment of the present invention.

FIG. 11 is a sectional view of a hybrid light modulator, according to an eighth embodiment of the present invention. Referring to FIG. 11, in the hybrid light modulator according to the eighth embodiment, a plurality of protrusions 1620a, 1620b and 1620c are provided on a third micromirror layer 1615c of an element 1610 which has the same structure as that of the element 1610 of the seventh embodiment. At this time, the protrusions 1620a, 1620b and 1620c are arranged along a latitudinal axis of the element 1610. The element 1610 of the eight embodiment includes first and second micromirror layers 1615a and 1615b which are laminated on first and second upper electrode layers 1614a and 1614b, respectively, unlike the element 1410c of the third embodiment shown in FIG. 8c.

Each protrusion 1620a, 1620b, 1620c includes a support layer 1621a, 1621b, 1621c which is attached at a lower surface thereof to an upper surface of the third micromirror layer 1615c, and a mirror layer 1622a, 1622b, 1622c which is layered on the support layer 1621a, 1621b, 1621c.

In the hybrid light modulator of FIG. 11, one pixel is formed by both the first micromirror layer 1615a and a part of the third micromirror layer which is exposed between the first micromirror layer 1615a and the first protrusion 1620a.

Another pixel is formed by both the first protrusion 1620a and a part of the third micromirror layer which is exposed between the first protrusion 1620a and the second protrusion 1620b. In the same manner as above, a plurality of pixels can be embodied in a single element 1610. The general construction of the element 1610 of the eighth embodiment, aside from the above-mentioned structure, remains the same as the seventh embodiment, therefore further explanation is deemed unnecessary.

Figure 12:
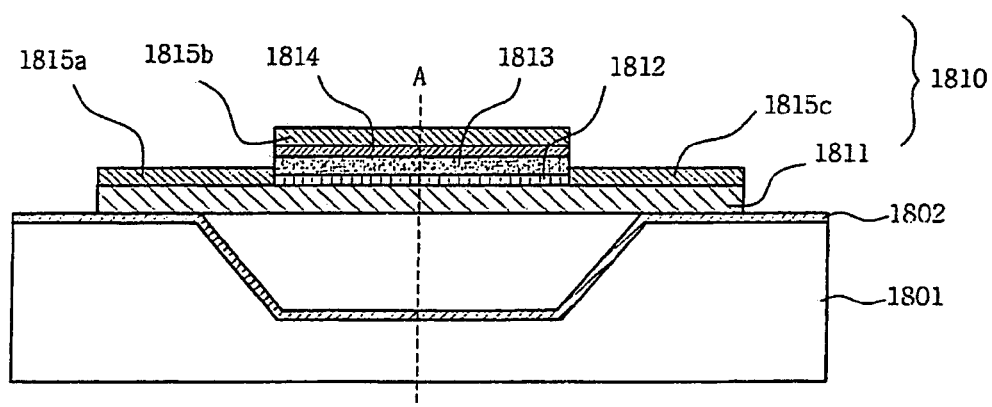
FIG. 12 is a sectional view of a hybrid light modulator, according to a ninth embodiment of the present invention.

FIG. 12 is a sectional view of a hybrid light modulator, according to a ninth embodiment of the present invention.

Referring to FIG. 12, an element 1810 of the hybrid light modulator according to the ninth embodiment includes first and third micromirror layers 1815a and 1815c which are provided on both ends of a lower supporter 1811, unlike the element 1410e of the fifth embodiment shown in FIG. 8e. In the hybrid light modulator of FIG. 12, one pixel is formed by both the first micromirror layer 1815a and a part of the second micromirror layer 1815b which is on one side of line A–A' of FIG. 12. The other one pixel is formed by both the third micromirror layer 1615c and a part of the second micromirror layer 1615b which is on the other side of the line A–A' of FIG. 12. The general construction of the element 1810 of the ninth embodiment, aside from the above-mentioned structure, remains the same as the fifth embodiment of FIG. 8e, therefore further explanation is deemed unnecessary.

Figure 13A:
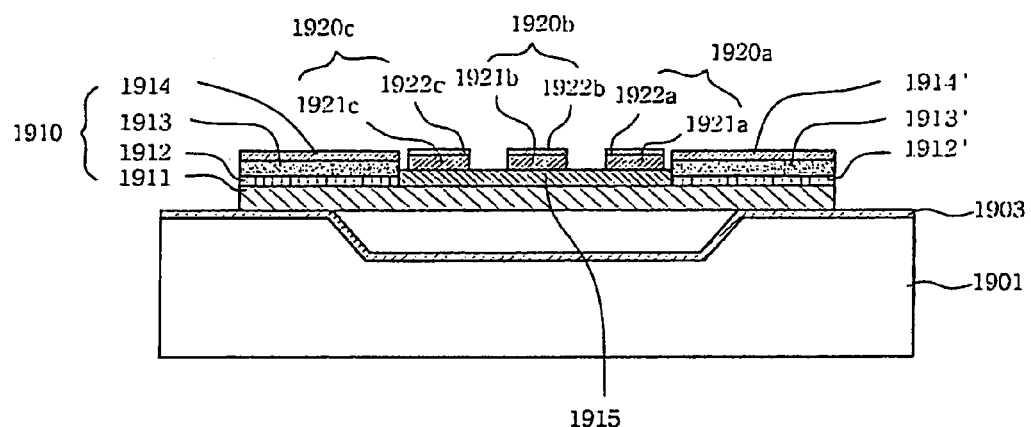
FIGS. 13a through 13c are views showing operation of the hybrid light modulator, according to the present invention.
Figure 13B:
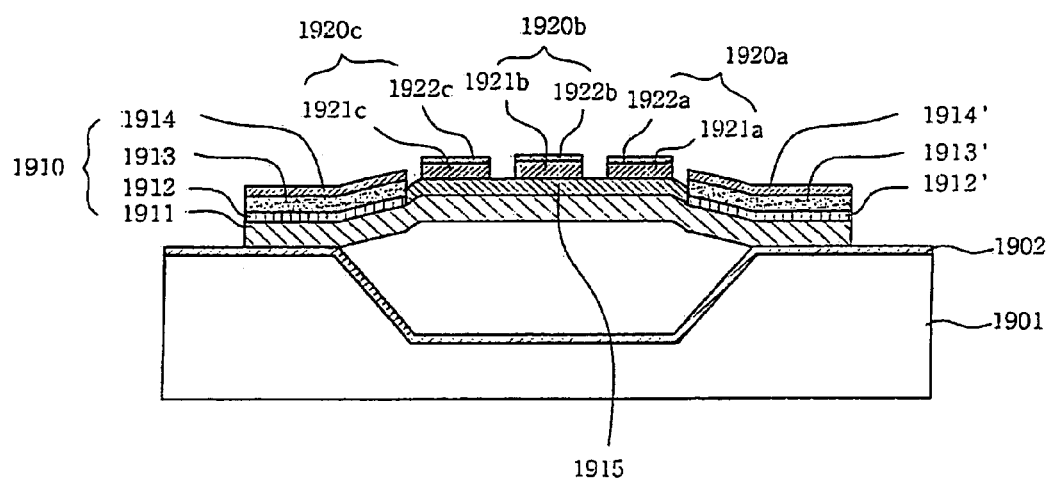
Figure 13C:
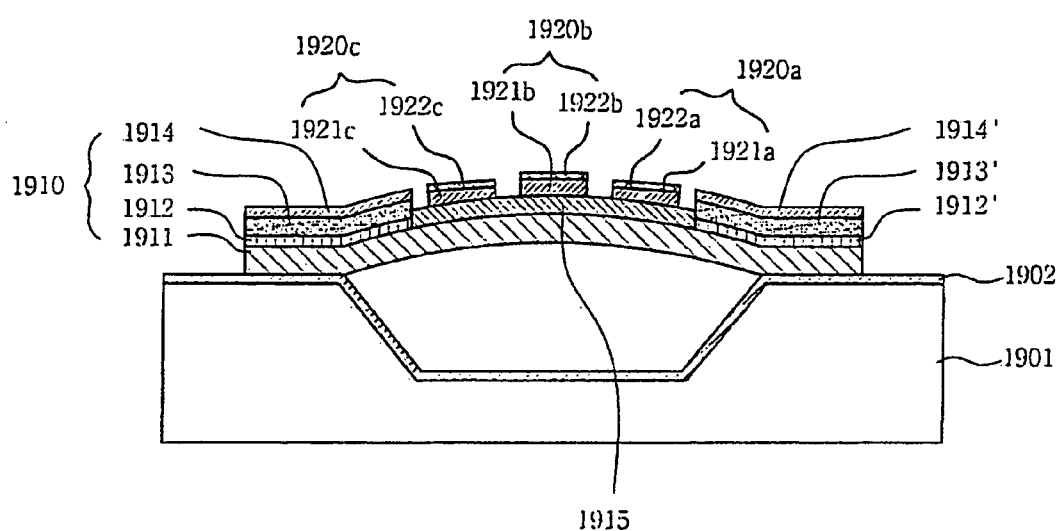

FIGS. 13a through 13c are views showing operation of the hybrid light modulator, according to the present invention.

Referring to FIG. 13a, the hybrid light modulator includes a plurality of protrusions 1920a, 1920b and 1920c. As shown in FIG. 13b, if a lower supporter 1911 is rigid, the protrusions 1920a, 1920b and 1920c vertically move without being stepped.

However, as shown in FIG. 13c, if the lower supporter 1911 is flexible, the protrusions 1920a, 1920b and 1920c vertically move while forming a stepped structure. As a result, the direction of diffracted light is changed.

In other words, according to a degree of the rigidity of the lower supporter 1911, the direction of diffracted light may be maintained or changed. Therefore, the hybrid light modulator of the present invention can diffract incident lights in a wide direction.

As described above, the present invention provides a hybrid light modulator which realizes miniaturization of products, thus reducing production costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hybrid light modulator, comprising:
a substrate having a recess thereon to provide an air space to an intermediate portion of the substrate; and
a light modulating element having a ribbon shape, attached at both ends thereof to the substrate along upper ends of sidewalls of the recess of the substrate while being spaced at an intermediate portion thereof from a bottom of the recess, and comprising a thin-film piezoelectric material layer, so that the intermediate portion of the light modulating element moves vertically when voltage is applied to both sides of the thin-film piezoelectric material layer, the light modulating element further comprising a plurality of protrusions on an upper surface thereof to diffract incident light using both each protrusion and a part of the upper surface of the light modulating element neighboring each protrusion.

2. The hybrid light modulator according to claim 1, wherein the protrusions are arranged on the upper surface of the light modulating element to be spaced apart from each other at predetermined intervals.

3. A hybrid light modulator, comprising:
a substrate having a recess thereon to provide an air space to an intermediate portion of the substrate;
a lower supporter having a ribbon shape and attached at both ends thereof to the substrate along upper ends of sidewalls of the recess of the substrate while being spaced from a bottom of the recess at an intermediate portion thereof, the lower supporter being vertically movable at the intermediate portion thereof, which is spaced from the substrate; and
a light modulating element laminated on the lower supporter such that both ends of the light modulating element are placed above the recess of the substrate, and comprising a thin-film piezoelectric material layer, so that a predetermined portion of the light modulating element spaced from the bottom of the recess moves vertically when voltage is applied to both sides of the thin-film piezoelectric material layer, the light modulating element further comprising a plurality of protrusions on an upper surface thereof to diffract incident light using both each protrusion and a part of the upper surface of the light modulating element neighboring each protrusion.

4. The hybrid light modulator according to claim 3, wherein the protrusions are arranged on the upper surface of the light modulating element to be spaced apart from each other at predetermined intervals.

5. A hybrid light modulator, comprising:
a substrate having a recess thereon to provide an air space to an intermediate portion of the substrate;
a lower supporter having a ribbon shape and attached at both ends thereof to the substrate along upper ends of sidewalls of the recess of the substrate while being spaced at an intermediate portion thereof from a bottom of the recess;
a first piezoelectric layer placed at a first end thereof on a first end of the lower supporter and placed at a second end thereof on a predetermined position of the lower supporter at a location over the recess, the first piezoelectric layer comprising a first thin-film piezoelectric material layer to generate a vertical actuating force by shrinking and expanding when voltage is applied to the first thin-film piezoelectric material layer;
a second piezoelectric layer placed at a second end thereof on a second end of the lower supporter and placed at a first end thereof on a predetermined position of the lower supporter at a location over the recess, the second piezoelectric layer comprising a second thin-film piezoelectric material layer to generate a vertical actuating force by shrinking and expanding when a voltage is applied to the second thin-film piezoelectric material layer; and
a mirror layer laminated on the intermediate portion of the lower supporter between the first and second piezoelectric layers, the mirror layer comprising a plurality of protrusions on an upper surface thereof to diffract incident light using both each protrusion and a part of the upper surface of the mirror layer neighboring each protrusion.

6. The hybrid light modulator according to claim 5, wherein the plurality of protrusions is arranged on the upper surface of the mirror layer to be spaced apart from each other by predetermined intervals.

7. A hybrid light modulator, comprising:
a substrate having an insulating layer formed on an upper surface thereof;
a lower supporter having a ribbon shape and attached at both ends thereof to the substrate while being spaced at an intermediate portion thereof from the substrate by a predetermined distance, the lower supporter being vertically movable at the intermediate portion thereof, which is spaced from the substrate; and
a light modulating element laminated on the lower supporter, and comprising a thin-film piezoelectric material layer so that the light modulating element generates a vertical actuating force by shrinking and expanding when a voltage is applied to the piezoelectric material layer, thus being moved vertically at an intermediate portion of the light modulating element spaced from the substrate by a predetermined distance, the light modulating element further comprising a plurality of protrusions on an upper surface thereof to diffract incident light using both each protrusion and a part of the upper surface of the light modulating element neighboring each protrusion.

8. The hybrid light modulator according to claim 7, wherein the light modulating element is laminated on the lower supporter such that both ends of the light modulating element are placed within the intermediate portion of the lower supporter spaced from the substrate.

9. The hybrid light modulator according to claim 7, wherein the plurality of protrusions is arranged on the upper surface of the light modulating element to be spaced apart from each other at predetermined intervals.

10. A hybrid light modulator, comprising:
a substrate having an insulating layer formed on an upper surface thereof;
a lower supporter having a ribbon shape and attached at both ends thereof to the substrate while being spaced at an intermediate portion thereof from the substrate by a predetermined distance, the lower supporter being vertically movable at the intermediate portion thereof, which is spaced from the substrate;
a first piezoelectric layer placed at a first end thereof on a first end of the lower supporter and placed at a second end thereof on a predetermined position at an intermediate portion of the lower supporter, the first piezoelectric layer comprising a first thin-film piezoelectric material layer to generate a vertical actuating force by shrinking and expanding when a voltage is applied to the first thin-film piezoelectric material layer;

a second piezoelectric layer placed at a second end thereof on a second end of the lower supporter and placed at a first end thereof on a predetermined position of an intermediate portion of the lower supporter, the second piezoelectric layer comprising a second thin-film piezoelectric material layer to generate a vertical actuating force by shrinking and expanding when a voltage is applied to the second thin-film piezoelectric material layer; and a mirror layer formed on the intermediate portion of the lower supporter between the first and second piezoelectric layers, the mirror layer comprising a plurality of protrusions on an upper surface thereof to diffract incident light using both each protrusion and a part of the upper surface of the mirror layer neighboring each protrusion.

11. The hybrid light modulator according to claim 10, wherein the plurality of protrusions is arranged on the upper surface of the mirror layer-to be spaced apart from each other at predetermined intervals.

12. A hybrid light modulator, comprising:
a substrate having a recess thereon to provide an air space to an intermediate portion of the substrate;
a lower supporter having a ribbon shape and attached at both ends thereof to the substrate while being spaced at an intermediate portion thereof from a bottom of the recess of the substrate by a predetermined distance, the lower supporter being vertically movable at the intermediate portion thereof, which is spaced from the substrate;
a piezoelectric mirror layer laminated on the lower supporter such that both ends of the piezoelectric mirror layer are placed above the recess, and comprising a thin-film piezoelectric material layer, so that a predetermined portion of the piezoelectric mirror layer spaced from the bottom of the recess moves vertically when voltage is applied to both sides of the thin-film piezoelectric material layer, thus reflecting or diffracting incident light;
a first mirror layer laminated on a first end of the lower supporter while being stepped from the piezoelectric mirror layer, thus reflecting or diffracting incident light; and
a second mirror layer laminated on a second end of the lower supporter while being stepped from the piezoelectric mirror layer, thus reflecting or diffracting incident light.

13. A hybrid light modulator, comprising:
a substrate having a recess thereon to provide an air space to an intermediate portion of the substrate;
a lower supporter having a ribbon shape and attached at both ends thereof to the substrate while being spaced at an intermediate portion thereof from a bottom of the recess of the substrate by a predetermined distance;
a first piezoelectric layer placed at a first end thereof on a first end of the lower supporter and placed at a second end thereof on a predetermined position at an intermediate portion of the lower supporter, the first piezoelectric layer comprising a first thin-film piezoelectric material layer to generate a vertical actuating force by shrinking and expanding when a voltage is applied to the first thin-film piezoelectric material layer, thus reflecting or diffracting incident light;
a second piezoelectric layer placed at a second end thereof on a second end of the lower supporter and placed at a first end thereof on a predetermined position at an intermediate portion of the lower supporter, the second piezoelectric layer comprising a second thin-film piezoelectric material layer to generate a vertical actuating force by shrinking and expanding when a voltage is applied to both sides of the second thin-film piezoelectric material layer, thus reflecting or diffracting incident light;

a mirror layer formed on the intermediate portion of the lower supporter between the first and second piezoelectric layers while being stepped from the first and second piezoelectric layers, thus reflecting or diffracting incident light; and a plurality of protrusions arranged on the upper surface of the mirror layer to be spaced apart from each other at predetermined intervals, so that incident light is reflected or diffracted both by each protrusion and by a part of the upper surface of the mirror layer neighboring each protrusion.

14. A hybrid light modulator, comprising:
a substrate having an insulating layer formed on an upper surface thereof;
a lower supporter having a ribbon shape and attached at both ends thereof to the substrate while being spaced at an intermediate portion thereof from the substrate by a predetermined distance, the lower supporter being vertically movable at the intermediate portion thereof, which is spaced from the substrate;
a piezoelectric mirror layer laminated on the lower supporter such that both ends of the piezoelectric mirror layer are placed on the intermediate portion of the lower supporter spaced from the substrate, and comprising a thin-film piezoelectric material layer, so that a predetermined portion of the piezoelectric mirror layer spaced from the substrate moves vertically when voltage is applied to the thin-film piezoelectric material layer, thus reflecting or diffracting incident light;
a first mirror layer laminated on a first end of the lower supporter while being stepped from the piezoelectric mirror layer, thus reflecting or diffracting incident light; and
a second mirror layer laminated on a second end of the lower supporter while being stepped from the piezoelectric mirror layer, thus reflecting or diffracting incident light.

15. A hybrid light modulator comprising;
a substrate having an insulating layer formed on an upper surface thereof;
a lower supporter having a ribbon shape and attached at both ends thereof to the substrate while being spaced at an intermediate portion thereof from the substrate by a predetermined distance;
a first piezoelectric layer placed at a first end thereof on a first end of the lower supporter and placed at a second end thereof on a predetermined position at an intermediate portion of the lower supporter, the first piezoelectric layer comprising a first thin-film piezoelectric material layer to generate a vertical actuating force by shrinking and expanding when a voltage is applied to the first thin-film piezoelectric material layer, thus reflecting or diffracting incident light;
a second piezoelectric layer placed at a second end thereof on a second end of the lower supporter and placed at a first end thereof on a predetermined position at an intermediate portion of the lower supporter, the second piezoelectric layer comprising a second thin-film piezoelectric material layer to generate a vertical actuating force by shrinking and expanding when a voltage is applied to both sides of the second thin-film piezoelectric material layer, thus reflecting or diffracting incident light;

a mirror layer formed on the intermediate portion of the lower supporter between the first and second piezoelectric layers while being stepped from the first and second piezoelectric layers, thus reflecting or diffracting incident light; and a plurality of protrusions arranged on the upper surface of the mirror layer to be spaced apart from each other at predetermined intervals, so that incident light is reflected or diffracted both by each protrusion and by a part of the upper surface of the mirror layer neighboring each protrusion.

* * * * *